…

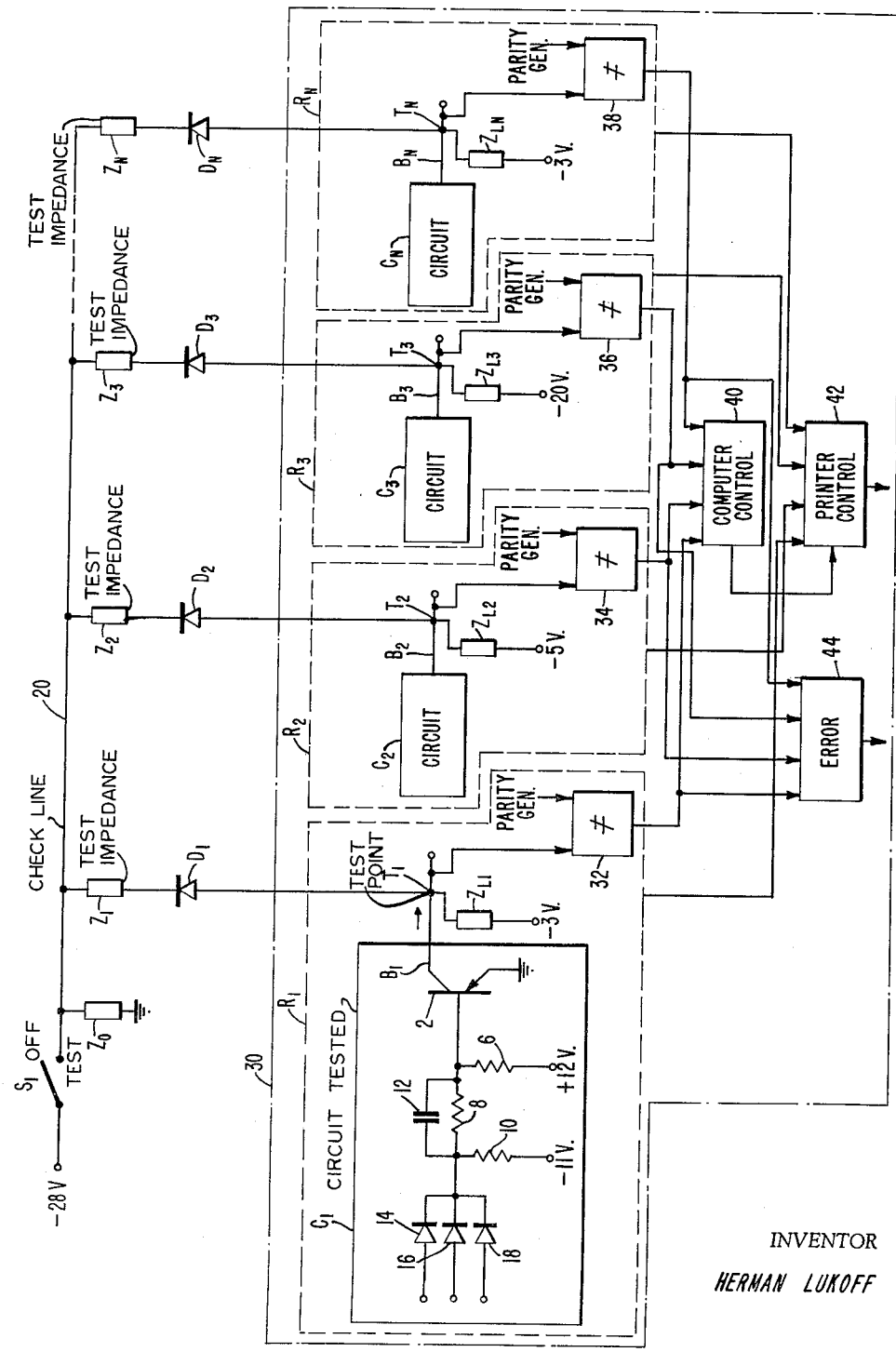

United States Patent Office 3,132,304
Patented May 5, 1964

3,132,304
MARGINAL CHECKING SYSTEM EMPLOYING SWITCH MEANS FOR SELECTIVE AND SIMULTANEOUS INTRODUCTION OF AUXILIARY PARALLEL LOADS
Herman Lukoff, Philadelphia, Pa., assignor to Sperry Rand Corporation, New York, N.Y., a corporation of Delaware
Filed Mar. 15, 1961, Ser. No. 95,851
13 Claims. (Cl. 328—271)

This invention relates to a marginal checking system, and more particularly, to one wherein the loads of a plurality of different kinds of circuits may be simultaneously varied but individually adjusted, so that all marginal circuits fail for the same test procedure.

Many electronic systems, such as data processing and computing equipment, require an extremely high degree of component reliability to insure accurate results. Component malfunctioning during an operating period is especially serious when its presence cannot be ascertained merely from an examination of the results, or when a previously derived intermediate result is lost because of system shutdown in the middle of a program. Although there are several different degrees of component failure, i.e., inability to perform a required design function, the most troublesome is where the failure is intermittent. Here, a component provides trouble free operation for relatively long periods of time between which it evidences failure to carry out its required task. Such a condition is typically caused by aging or the like, with a good example being the gradual deterioration of tube or transistor characteristics over a period of time.

The identification of components exhibiting this class of failure is difficult because of the random occurrence of the fault. For example, a component may operate satisfactorily during a short maintenance period under normal operations but otherwise intermittently fail in the course of a program run where it is repetitively employed. However, the prior art has found that intermittent failure under optimum normal operating conditions will most likely become permanent failure if these conditions are worsened. For example, a circuit may be designed to produce a particular output voltage or current signal magnitude or waveform when supplied with its normal system bias voltages, but fails to do so on occasion because of a gradually deteriorating tube or transistor contained therein. If these bias voltages are changed within certain limits, however, the circuit under this different condition may never generate a signal within design tolerances, and so always fail to perform its function. Other similar circuits without any intermittently defective components will continue to correctly operate even under these changed conditions. This technique is also useful in locating components which, although not yet exhibiting any failure during normal operating conditions, are nevertheless so potentially defective that they fail under the test conditions.

The above procedure has been termed "marginal check," and is usually performed during a maintenance period.

For ease in construction, the condition varied for the marginal check operation is usually common to all or most of the circuits contained in a system. As an example, it is customary to vary the main B+ supply voltages from normal values in order to see if each circuit in the system continues to respond within its prescribed design tolerances. Very often a test program having predetermined intermediate and final results is presented to the system at this time so that errors may be readily detected. If one or more components within a circuit are defective or potentially defective due to aging and the like, then the circuit always fails to perform satisfactorily under marginal check conditions and is consequently replaced. Other conditions common to all or most of the system circuits may likewise be changed from normal during the test period to determine marginal circuits and components. However, where there are different types of circuits in the same system, it is unlikely that the same marginal test change in a parameter common to all, e.g., the B+ voltages, will cause all marginal circuits to be detected. For example, where there are two or more groups of circuits each requiring a different value of B+ voltage, then a marginal test change in one B+ voltage will not necessarily be the marginal test change required by other B+ voltages. Also, it may further be necessary to use more than one marginal test value of the same B+ voltage in order to determine marginal circuits of different design, but having the same normal bias potentials. Therefore, the prior art procedure has been to successively adjust the common parameter in steps, whereby each step provides a valid marginal check condition but for a few circuit types. Since a large system may be comprised of a great number of different circuit configurations, each of which requires different marginal test conditions, such maintenance procedure can be quite lengthy.

The present invention reduces the time necessary for marginal checking by providing a plurality of auxiliary marginal check loads, one for each circuit to be tested but with each individually adjusted, so that all circuits in the system may be simultaneously checked, which results in a substantial saving of time required during the maintenance period. This function is generally provided by a separate unidirectional current conducting device associated with each of the auxiliary loads for disconnecting the latter from the electronic circuit during times other than the maintenance period. The unidirectional devices also isolate the auxiliary loads from each other during the marginal check.

It is therefore an object of the present invention to provide a marginal checking system wherein different kinds of electronic circuits may be simultaneously tested under conditions individual thereto.

Another object of the present invention is to provide a marginal checking circuit having a plurality of auxiliary loads, each of which includes a unidirectional current conducting device for isolating each auxiliary load from the normal circuit load except during a maintenance period.

A further object of the present invention is to provide a marginal checking system for simultaneously and individually varying the loads of a plurality of electronic circuits, without there being any feed back or cross talk between said loads.

These and other objects of the present invention will become apparent during the course of the following description, which is to be taken in conjunction with the single figure of the application in which is shown an embodiment of the invention used with some representative circuits.

Referring now to the figure, there is shown one embodiment of the marginal check system for determining defective electronic components in a plurality of different kinds of electronic circuits, each of which is simultaneously supplied with a different change in its output load so that all marginal circuits will be identified during the run of a test program through the system. The marginal check system comprises a single conductor 20 between which and a plurality of circuits $C_1$ to $C_N$ are connected a plurality of auxiliary loads $Z_1$ to $Z_N$. Each load $Z_1$ to $Z_N$ has associated therewith a unidirectional current conducting device $D_1$ to $D_N$. Each of the circuits may take any form which is usually found in a typical electronic system. For example, the circuit $C_1$ is shown to comprise a transistor 2 having its emitter connected to a ground potential and its collector connected via conductor $B_1$ to an output terminal $T_1$. An input to transistor 2 is applied via its base electrode by a circuit configuration consisting of resistors 6, 8, 10, capacitor 12, and diode devices 14, 16, and 18. The particular function of circuit $C_1$ is that of a logical gate, however, its details are shown merely to indicate one of the many varieties of circuits which may be marginally checked by the present invention. Associated with the collector electrode of transistor 2 is a load impedance $Z_{L1}$ connected between terminal $T_1$ and a bias potential of −3 volts. Transistor 2 is of the P-N-P variety such that its collector is normally biased negative with respect to both its emitter and base. Conventional current flow in its collector circuit is in a direction toward the output terminal $T_1$ and through impedance $Z_{L1}$ to the negative −3 volt potential.

The marginal check circuit associated with $C_1$ is comprised of a unidirectional current conducting device $D_1$ having its anode connected to terminal $T_1$ and its cathode connected in series with one terminal of the auxiliary impedance $Z_1$. The other terminal of impedance $Z_1$ is connected to the single marginal check line 20. An impedance $Z_0$ is connected between marginal check conductor 20 and a source of ground potential, which in turn is positive with respect to the −3 volt potential connected to one terminal of impedance Z. Impedances $Z_{L1}$, $Z_1$, and $Z_0$ may be resistive, inductive, capacitive, or combinations of these.

It will thus been seen that the application of a ground potential through $Z_0$ to check line 20 causes the cathode of device $D_1$ to be positive with respect to its anode. This is so because of the negative −3 volt potential applied to one terminal of impedance $Z_{L1}$. Even when circuit $C_1$ is actuated by a base input signal such that maximum current flows in the collector of transistor 2, this current flow through impedance $Z_{L1}$ still maintains the anode of device $D_1$ at a potential lower than its cathode inasmuch as the emitter is held at ground potential. As is well known in the art, a unidirectional current conducting device, such as a diode, has an asymmetrical V–I characteristic. Thus, the device effectively constitutes an open circuit when the potential of its cathode is greater than that of its anode. In such a case, the device is said to be reverse biased so that substantially no current flows therethrough, and the anode and cathode potential are effectively isolated from each other. Conversely, if the anode of device $D_1$ has a potential higher than that of its cathode, the device is forward biased such that a substantial current may flow therethrough, with a fixed potential drop being maintained across the device no matter what the current magnitude. In the latter situation, the device acts almost as a short circuit.

As may therefore be appreciated from the above, the effect of the ground potential applied to conductor 20 via a common impedance $Z_0$ is such as to maintain device $D_1$ in its reverse biased condition so that the auxiliary impedance $Z_1$ is effectively disconnected from the output load of circuit $C_1$. This state of affairs exists during the actual operating time of the system in which the circuit $C_1$ finds itself. During the marginal check operation, however, it is desired to increase the loading on circuit $C_1$ which means that its total load impedance decreases, thus resulting in an increased current flow in the collector of transistor 2. This worsens the operating condition of the circuit when compared to the normal designed condition, such that all marginal components therein will exhibit permanent failure to carry out their designed functions as long as the test condition prevails. Such failure may be evidenced by a signal at terminal $T_1$ whose wave form shape or magnitude is such as to present inaccurate information (in the case where a digital or analog code is employed) or where said signal is unable to drive succeeding circuits to which it may be applied. In order to increase the loading on circuit $C_1$, therefore, the technique in the present invention is to insert the impedance $Z_1$ substantially in parallel with the output load $Z_{L2}$ and its biasing −3 volt potential. This is done by means of a switch $S_1$ which, when closed, connects the check line 20 to a source of potential more negative than that appearing at terminal $T_1$. In the figure, for reasons hereafter to be described, this potential applied to conductor 20 via switch $S_1$ is −28 volts. Therefore, upon the closing of switch $S_1$, the potential of −28 volts is applied to conductor 20 such that device $D_1$ becomes forward biased so as to constitute almost a short circuit between its anode and cathode. The result is to place auxiliary impedance $Z_1$ and the −28 volt potential in parallel with load $Z_{L1}$ and a −3 volt potential. This parallel path decreases the effective load impedance of $C_1$, which thereby increases the current in the collector circuit transistor 2. Impedance $Z_1$ is of such magnitude, determined by the particular circuit being tested, as to cause the circuit to fail during the marginal check operation if it is marginal. Upon opening switch $S_1$, the −28 volt potential is disconnected from check line 20 such that device $D_1$ again becomes reverse biased, which removes auxiliary impedance $Z_1$ from the output of circuit $C_1$.

For each of the other circuits, $C_2$ to $C_N$ contained in the system to be checked, a similar type of marginal check circuit is provided, which respectively consists of a unidirectional current conducting device $D_2$ to $D_N$ and an auxiliary load impedance $Z_2$ to $Z_N$. For example, for circuit $C_2$, the components $Z_2$ and $D_2$ are connected in series between the output terminal $T_2$ and the check line 20. The details of circuit $C_2$ may be different from those shown in $C_1$, however, they do include a load impedance $Z_{L2}$ which is coupled between the output terminal $T_2$ and a bias potential of −5 volts. It is also assumed in the circuit of $C_2$ that the current flow in the output conductor $B_2$ is in the same direction with respect to its output terminal as that of the current in output conductor $B_1$ of circuit $C_1$. However, the bias potential associated with impedance $Z_{L2}$ need not have the same magnitude as that associated with impedance $Z_{L1}$. Circuits $C_3$ to $C_N$ have like output configurations in that each includes an output terminal T, an output conductor B, and a load impedance $Z_L$ connected between the output terminal and a source of bias potential. The configurations of each of the $C_3$ to $C_N$ circuits may be entirely different from that of $C_1$ or $C_2$, however, each must have a current flowing in the same direction in its output conductor as that of all the other circuits associated with the check line 20. The marginal check circuits are connected between the single check line 20 and an associated one of the output terminals, $T_3$–$T_N$, with the unidirectional current conductive devices $D_3$ to $D_N$ all being poled in the same direction.

The operation of the marginal check circuits for $C_2$ to $C_N$ is the same as that described for circuit $C_1$. When switch $S_1$ is open, the potential applied to check line 20 via impedance $Z_0$ is positive with respect to all of the potentials appearing at the respective output terminals such that each and every device $D_2$ to $D_N$ is reverse biased. Upon closing switch $S_1$, the −28 volt potential applied to conductor 20 is sufficiently negative with respect to the potentials at each output terminal to forward bias each and every device $D_2$ to $D_N$. Each of the respective auxiliary loads $Z_2$ to $Z_N$ is therefore effectively applied in parallel with the normal load of its associated circuit such as to increase the loading on the component or components therein being tested.

As noted previously, the change in load during the marginal check time may need to be different for each variety of circuit in order that the failure of all marginal components will occur. Therefore, each of the auxiliary impedances $Z_1$ to $Z_N$ can be individually adjusted in accordance with the parameters of the circuit with which it is associated. It may thus be appreciated how the present invention permits the simultaneous checking of a large number of different kinds of circuits, where each requires a different change of load in order for a valid marginal test to be performed. It should also be noted that the use of unidirectional current conducting devices $D_1$ to $D_N$ effectively isolates one marginal check circuit from another even though all have one terminal thereof connected to the common line 20. Therefore, although all of the marginal check loads are connected in circuit at the same time, there can be no undesirable feed back or cross talk between circuits $C_1$ to $C_N$. This is another important advantage of the present system and one that is believed to be novel in the marginal checking art.

Although the details of only one typical circuit $C_1$ is shown, it is apparent that the present invention may be used to marginally check vacuum tube circuits as well as those having solid state components. Furthermore, this invention may be adapted to simultaneously check a group of circuits each having its output conductor current flowing in a direction away from its output terminal. Such would be the case if transistor 2 were an N–P–N type instead of P–N–P, or if a vacuum tube triode were used as the active component. This further embodiment of the invention would require that the devices $D_1$ to $D_N$ be reversed in polarity, and that the potentials associated with impedance $Z_0$ and switch $S_1$ be of such magnitude and polarity, with respect to the load biasing potentials, that devices $D_1$ to $D_N$ are reverse biased when switch $S_1$ is opened and forward biased when $S_1$ is closed.

In order to emphasize the advantages of the present invention when used in a typical data processing system, functions will be arbitrarily assigned to each of the circuits $C_1$ through $C_N$. For example, assume that each circuit is one of a plurality of transfer gates comprising one of a group of $R_1$ through $R_N$ data paths in the system through which parallel information may be transmitted, and that each circuit $C_1$ through $C_N$ passes the parity bit associated with its correspondingly numbered data path $R_1$ through $R_N$. Thus, circuit $C_1$ is the parity bit transfer gate in data path $R_1$, while $C_N$ is the parity bit transfer gate in data path $R_N$. Each data path $R_1$ through $R_N$ also has a plurality of transfer gates (not shown) for this parallel transfer of information bits with which the parity bit is associated, as is customary in many systems. A data transfer path extends between two or more units in a system, and information may flow in two or more data paths at the same time depending upon the program step being performed. Associated with the information bit gates in each path is a corresponding parity generator (not shown) which calculates the parity of said information bits. This calculated parity is then compared at a corresponding circuit 32, 34, etc., with the parity being transmitted along with the information via the corresponding gate C, so as to warn against loss of bit signals when the two fail to agree. If such disagreement exists, then a circuit 32, 34, etc., will activate the system control circuit 40 to stop the program, and to further cause an output device, such as a printer to indicate the information transmitted through the data path in question. An error signal may also be generated via unit 44 to indicate the faulty operation to an operator.

The parity generators and related circuits are built into the machine for use during the performance of a regular program. Thus, a mismatch between the calculated and transmitted parity bits in any of the data paths $R_1$–$R_N$ results in the operation described above. These same error circuits are also employed during a marginal test cycle when each of the parity transfer gates operate under marginal conditions due to a change in their normal output loads. Although only the one circuit and its corresponding auxiliary marginal check load is shown for each data path $R_1$–$R_N$, it is understood that each of the information bit transfer gates of each data path may likewise be operated with its individual marginal loads during the maintenance cycle. In this way, if any one of the information gates in path $R_1$, for example, fails to pass a pulse applied thereto, the path $R_1$ parity generator will calculate a parity unlike the transmitted parity at the output of circuit $C_1$. The printer control 42 then reads out the contents on path $R_1$, and error indicator 44 informs the operator of the system malfunction.

The error circuits for the other data paths likewise continue to function during a marginal check cycle, as well as during normal operation, so that marginal circuits may be detected in other parts of the system while the checking program is being run. Thus, a test program step may call for the simultaneous transfer of the same, or different information, through one or more of the data paths. Although the data paths may be comprised of gating circuits having different B+ supplies such as is shown in the figure, the use of individually adjusted marginal loads allows a valid marginal check to be performed on circuits in all data paths during but one test program run. This is a much more rapid procedure than that employed in the prior art, where the test program must be sequentially repeated, once for each kind of circuit to be checked.

The particular functions above assigned to the circuits $C_1$–$C_N$ are merely illustrative and therefore are not to be construed as a limitation of this invention. Circuits other than gates may be marginally checked in the manner here taught, nor is it necessary to have error detecting means associated with each circuit under test. Indeed, this is impossible in any large system comprised of many circuits, all or most of which must be examined for marginal components. It is obvious, then, that modifications made be made without exercise of invention by one skilled in the art and without departing from the spirit of the invention as defined in the appended claims.

I claim:

1. A marginal checking system for a group of electronic circuits each of which includes an output conductor, an output terminal connected to said output conductor, a bias potential, and a load impedance connected between said output terminal and said bias potential, whereby a current flow in any of said output conductors has a fixed direction with respect to its associated said output terminal, said system simultaneously providing a change of load for each said electronic circuit, and comprising: a single conductor, auxiliary load circuits each connected one between said single conductor and a respective one of said output terminals, each said auxiliary load circuit being comprised of an auxiliary impedance connected in series with a substantially unidirectional current conducting device poled to allow current to flow therethrough in a direction, with respect to its associated said output terminal, which is opposite to said fixed direction, a first potential, a common impedance connected between said single conductor and said first potential, a second potential, and switch means having first and second states for selectively disconnecting and connecting said single conductor with said second potential when in its first or second states, respectively, where the magnitude and polarity of said first potential is such with respect to each said bias potential so as to reverse bias all of said devices when said switch means is in its first state, and the magnitude and polarity of said second potential is such with respect to said first potential and each said bias potential so as to forward bias all of said devices when said switch means is in its second state.

2. A system according to claim 1 on which each said unidirectional current conducting device is a diode.

3. A system according to claim 1 in which each said auxiliary impedance has a magnitude which is a function of the parameters of the circuit with whose output terminal said auxiliary impedance is associated.

4. A system according to claim 3 in which each said unidirectional current conducting device is a diode.

5. A system according to claim 1 in which said first potential is positive with respect to each said bias potential, and said second potential is negative with respect to each said bias potential.

6. A system according to claim 5 in which each said unidirectional current conducting device is a diode.

7. A system according to claim 5 in which each said auxiliary impedance has a magnitude which is a function of the parameters of the circuit with whose output terminal said auxiliary impedance is associated.

8. A system according to claim 7 in which each said unidirectional current conducting device is a diode.

9. A system according to claim 1 in which a current in each said output conductor flows toward its associated said output terminal, and a current through each said device flows away from its associated said output terminal.

10. A system according to claim 9 in which each said unidirectional current conducting device is a diode.

11. A system according to claim 9 in which each said auxiliary impedance has a magnitude dependent upon the parameters of the circuit with whose output terminal said auxiliary impedance is associated.

12. A system according to claim 11 in which each said unidirectional current conducting device is a diode.

13. A marginal checking system for a group of electronic circuits each of which includes an output conductor, an output terminal connected to said output conductor, a bias potential, and a load impedance connected between said output terminal and said bias potential, whereby a current flow in any of said output conductors has a fixed direction with respect to its associated said output terminal, said system simultaneously providing a change of load for each said electronic circuit, and comprising: a single conductor, auxiliary load circuits each connected one between said single conductor and a respective one of said output terminals, each said auxiliary load circuit being comprised of an auxiliary impedance having a magnitude which is a function of the parameters of the circuit with whose output terminal it is associated, said auxiliary impedance being connected in series with a diode poled to allow current to flow therethrough in a direction, with respect to its associated said output terminal, which is opposite to said fixed direction, a first potential, a common impedance connected between said single conductor and said first potential, a second potential, and switch means having first and second states for selectively disconnecting and connecting said single conductor with said second potential when in its first or second states, respectively, where the magnitude and polarity of said first potential is such with respect to each said bias potential so as to reverse bias all of said diodes when said switch means is in its first state, and the magnitude and polarity of said second potential is such with respect to said first potential and each said bias potential so as to forward bias all of said diodes when said switch means is in its second state.

References Cited in the file of this patent

UNITED STATES PATENTS 3,014,202     Hanewinkel  ------------ Dec. 19, 1961